(12) United States Patent
Buschmann et al.

(10) Patent No.: US 7,374,253 B2
(45) Date of Patent: May 20, 2008

(54) METHOD FOR MONITORING THE AIR BLEEDING QUALITY OF AN ELECTROHYDRAULIC BRAKING SYSTEM

(75) Inventors: Gunther Buschmann, Idstein (DE); Martin Baechle, Glashütten (DE); Axel Wagner, Schlüchtern (DE); Michael Hitzel, Rödermark (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 237 days.

(21) Appl. No.: 10/524,248

(22) PCT Filed: Aug. 13, 2003

(86) PCT No.: PCT/EP03/08984

§ 371 (c)(1),
(2), (4) Date: Oct. 28, 2005

(87) PCT Pub. No.: WO2004/016488

PCT Pub. Date: Feb. 26, 2004

(65) Prior Publication Data

US 2006/0138861 A1    Jun. 29, 2006

(30) Foreign Application Priority Data

Aug. 13, 2002  (DE) ................. 102 36 971
Feb. 28, 2003  (DE) ................. 103 08 737

(51) Int. Cl.
*B62D 55/10* (2006.01)

(52) U.S. Cl. ................ 303/122.08; 303/122.13; 188/352

(58) Field of Classification Search ........... 303/122.08, 303/122.13, DIG. 10, DIG. 11, 115.1, 11, 303/3; 188/352; 73/129, 121
See application file for complete search history.

(56) References Cited

U.S. PATENT DOCUMENTS

| 5,605,384 | A  | * | 2/1997 | Johnston et al. | 303/113.1 |
| 6,179,392 | B1 | * | 1/2001 | Baechle et al. | 303/113.1 |
| 6,193,031 | B1 | * | 2/2001 | Baechle et al. | 188/352 |
| 6,199,958 | B1 | * | 3/2001 | Baechle | 303/10 |
| 6,705,683 | B2 | * | 3/2004 | Niepelt et al. | 303/122.13 |
| 2006/0152072 | A1 | * | 7/2006 | Baechle et al. | 303/11 |
| 2006/0192426 | A1 | * | 8/2006 | Baechle et al. | 303/119.1 |

FOREIGN PATENT DOCUMENTS

| DE | 196 03 863 A1 | 8/1997 |
| DE | 100 60 225 A1 | 10/2001 |
| EP | 0 829 648 A1  | 3/1998 |
| WO | WO 90/02066   | 3/1990 |

\* cited by examiner

*Primary Examiner*—Robert A. Siconolfi
*Assistant Examiner*—Mariano Sy
(74) *Attorney, Agent, or Firm*—RatnerPrestia

(57) ABSTRACT

The invention discloses a method for determining the air content of the brake fluid in a hydraulic braking system. This method also permits determining the quality of the bleeding of the braking system.

The principle of the method is a comparison of the volume intake with the respectively achieved pressure. The correlation is compared to nominal values. As the volume intake is determined by the clearance, the system is set by means of a pre-actuation to an initial condition before each actual measurement.

4 Claims, 2 Drawing Sheets

METHOD FOR MONITORING THE AIR BLEEDING QUALITY OF AN ELECTROHYDRAULIC BRAKING SYSTEM

TECHNICAL FIELD

The present invention generally relates to a method for testing the bleeding quality and more particularly relates to a method for testing the bleeding quality of an electrohydraulic braking system, comprising a pedal-operated master brake cylinder and a brake circuit controlled by the master brake cylinder pressure and including a pump.

BACKGROUND OF THE INVENTION

A braking system of this type is filled with an incompressible brake fluid. The dimensioning of the individual components (master brake cylinder, high-pressure accumulator, wheel brakes, etc.) is adapted to the elasticities and clearances in the system. It does not take into account that the brake fluid itself, when enriched with air or water vapor, becomes compressible and contributes to the elasticity of the system. It is therefore necessary in a conventional system to exchange the brake fluid on a regular basis. Admittedly, this is also required in an electrohydraulic braking system, however, the system acts tolerantly with respect to an enrichment of the brake fluid with air because the pump and the high-pressure accumulator can supply an adequate rate of pressure fluid to be able to compensate an increased volume intake that is due to air inclusions. If, however, the electrohydraulic braking system switches to the conventional mode because e.g. the pump or the high-pressure accumulator has failed, the compressibility of the brake fluid will have a negative effect. As the pedal travel is limited it is only possible to reach a defined braking pressure which, depending on to what extent the brake fluid is enriched with air or water vapor, will no longer be adequate to achieve the deceleration of a vehicle mandated by law. An extension of the pedal travel allowing the driver to sense enrichment with gas in the conventional system is not imperatively available in the electrohydraulic system because the wheel brake is separated from the pedal area by operation of the separating valves.

BRIEF SUMMARY OF THE INVENTION

In view of the above, electrohydraulic braking systems provide monitoring modes being employed during operation and trying to conclude any air enrichment from the behavior of the system. These monitoring modes suffer from the disadvantage that some parameters which are required for the determination of the air enrichment cannot be defined with a sufficient rate of precision so that conclusions made from the data obtained with respect to the condition of the system are possible to a limited extent only. Thus, e.g. the clearance of the brake pads in relation to the brake discs is dynamically changed on account of the respective driving situation and, thus, undefined. It is also significantly different from the static clearance, which adjusts itself after a brake application so as to be reproducible within relatively narrow limits, with the vehicle at standstill.

Further, it cannot always be prevented that air is enclosed in the braking system after brake fluid exchange has been carried out incorrectly. The inclusion of air should preferably be detected after a brake fluid exchange before starting to drive still.

Thus, the invention is based on the problem of developing a method for testing the bleeding quality of an electrohydraulic brake system, wherein the air or gas load in the brake fluid or the inclusion of air bubbles can be reliably detected. To this effect, the method provides the following steps:

a) Bleeding the high-pressure accumulator.
b) Re-filling the high-pressure accumulator, during which action the filling degree of the high-pressure accumulator and the volume flow through the pump is determined.
c) Comparing the actual values determined in this process with preset specifications.
d) Applying the brake pedal when the separating valves are closed, so that a defined amount of pressure is applied to the wheel brakes connected to the brake circuit.
e) Releasing the brake pedal.
f) Re-applying the brake pedal, with at least the following data being detected:
pedal travel,
master brake cylinder pressure,
wheel brake cylinder pressure,
pressure fluid removal from the high-pressure accumulator.
g) Determining the volume intake of the master brake cylinder and the conduit reaching up to the separating valve by way of the determined pedal travel and the master brake cylinder pressure and comparison with the nominal values.
h) Determining the volume intake of the pressurized brake circuit by way of the pressure fluid removal from the high-pressure accumulator and the wheel brake cylinder pressures and comparison with the nominal values.
i) Delivering an appropriate warning when predetermined criteria are not satisfied.

In principle, pressure is applied to the system in a defined manner, and the volume intake is measured as this occurs. The pressure is adjusted only by pressure build-up, without pressure reduction. It is, however, necessary to this end that the braking system is moved into a normal condition beforehand so that it can be supposed for the following calculations that defined parameters prevail within narrow limits. For this purpose, initially the high-pressure accumulator is bled and subsequently re-filled, while the filling degree of the high-pressure accumulator and the volume flow through the pump is determined. This way, a defined filling degree of the high-pressure accumulator is first of all obtained. On the other hand, actual values in terms of the volume flow and the filling degree of the high-pressure accumulator can be compared with preset specifications.

When deviations appear, it can be inferred therefrom that there was, and possibly still is, an air inclusion at the suction side of the pump, meaning in the area of conduits between the pump and the pressure fluid reservoir, whereupon a corresponding warning can be delivered.

Likewise the application of the brake pedal according to step d) and the subsequent release of the brake pedal brings about that in particular the clearance of the wheel brakes and the position of the sealing sleeves in the master brake cylinder assume a quantity which can be estimated in good approximation.

Re-application of the brake pedal, while simultaneously a controlled brake application commences, is used for measuring pressure and volume intake, for what purpose according to partial step f) the pedal travel of the master brake cylinder pressure, the wheel brake pressures and the removal of pressure fluid from the high-pressure accumulator are determined. The volume intake of the master brake cylinder and the conduits reaching up to the separating valve can be determined from the comparison of the pedal travel with the master brake cylinder pressure. A comparison with nominal values can take place also in this event. The volume intake of the pressurized brake circuit is determined by way of the removal of pressure fluid from the high-pressure accumulator and the wheel brake cylinder pressures which, in turn, are compared to nominal values. Deviations allow conclusions with respect to the air load or the inclusion of air bubbles. In order that the model calculations necessary for this purpose found on a reliable basis, the comparisons are carried out only when a master brake cylinder pressure amounts to e.g. >15 bar and a maximum pedal application speed of <10 mm/s was maintained. The pressure build-up in the wheel brakes shall amount to >30 bar. In such cases, the measured values can be determined with a sufficient rate of accuracy, and it can be presupposed that model assumptions in terms of the volume intake apply with a sufficient rate of accuracy.

Further, the method shall only be performed when the temperature of the brake system is in a predefined normal range and amounts to +10° C. to +30° C.

To be able to reconstruct the results, the results are transmitted to a readable electronic memory.

DETAILED DESCRIPTION OF THE PREFERRED EMBODIMENTS

Figure 1:
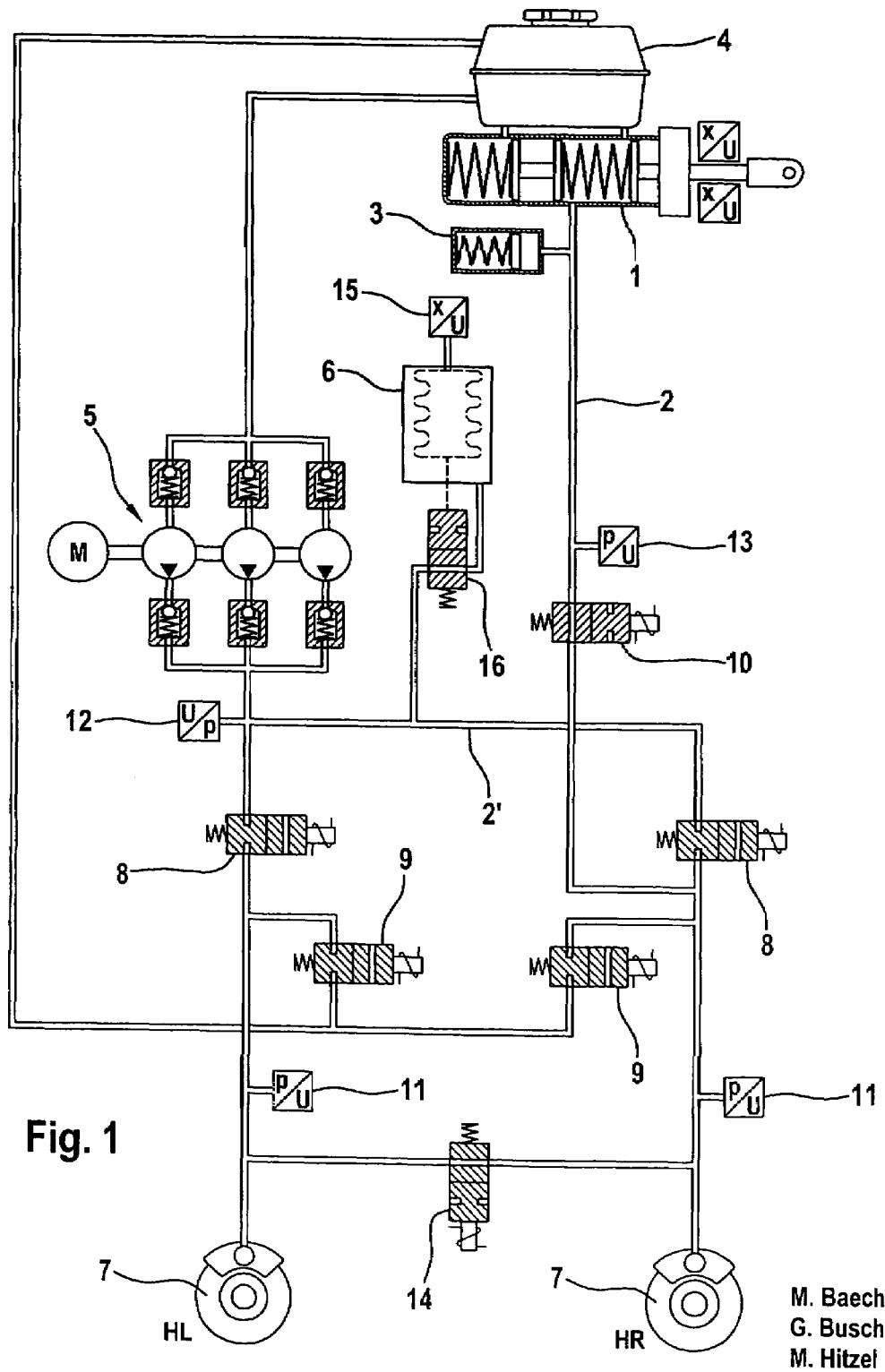
FIG. 1 is the hydraulic wiring diagram of a hydraulic braking system.

First of all, reference is made to FIG. 1. FIG. 1 shows a typical electrohydraulic braking system of the following design:

A tandem-type master brake cylinder comprises two brake circuits, one of which is illustrated, and the illustrated primary brake circuit 2 is connected to a pedal travel simulator 3. Further, a pressure fluid reservoir 4 is connected to the master brake cylinder 1. Pumps 5 driven by a motor and a high-pressure accumulator, e.g. a metal pleated-bellows accumulator 6, form a pressure fluid supply system being supplied with pressure fluid (brake fluid) out of the pressure fluid reservoir 4. The wheel brakes 7 of the rear axle are connected to this pressure fluid supply system by way of each one inlet valve 8 and, as a result, provide a controlled brake circuit 2'. In addition, a connection to the pressure fluid reservoir 4 can be established by way of one outlet valve 9 each. The inlet and the outlet valves 8, 9 are normally closed. Pressure increase in the wheel brakes 7 occurs by opening the respective inlet valve 8, while pressure decrease occurs by opening the respective outlet valve 9. A controlled brake circuit 2' is provided this way, and the pressure delivered to the wheel brakes 7 is determined by the master brake cylinder pressure, while the master brake cylinder 1 is hydraulically separated from the wheel brakes 7 in the event of a controlled braking operation. To this end, a separating valve 10 is incorporated in the conduit that opens into the conduits leading to the wheel brakes 7 downstream of the inlet valve 8, said separating valve being closed in the control mode and staying open only when the controlled brake circuit 2' is disturbed, e.g. due to failure of the pressure fluid supply.

The system is monitored and controlled among others by way of various pressure sensors. Braking pressure sensors 11 are associated with the individual wheel brakes 7, while a pump pressure sensor 12 is associated with the pressure fluid supply system, and one simulation pressure sensor 13 per brake circuit is associated with the master brake cylinder. The separating valve is closed during an electrohydraulic braking operation. The pressure in the master brake cylinder is used as a control quantity. To this end, the pressure in the master brake cylinder 1 is measured by means of the simulation pressure sensor 13 and sent as a control quantity to the control of the controlled brake circuit 2'. The separating valve 10 remains open upon failure of the pressure supply system. Thus, the wheel brakes 7 are connected directly to the master brake cylinder 1 in a conventional fashion. As this occurs, a compensating valve 14 ensures a pressure balance between the wheel brakes of an axle.

Figure 2:
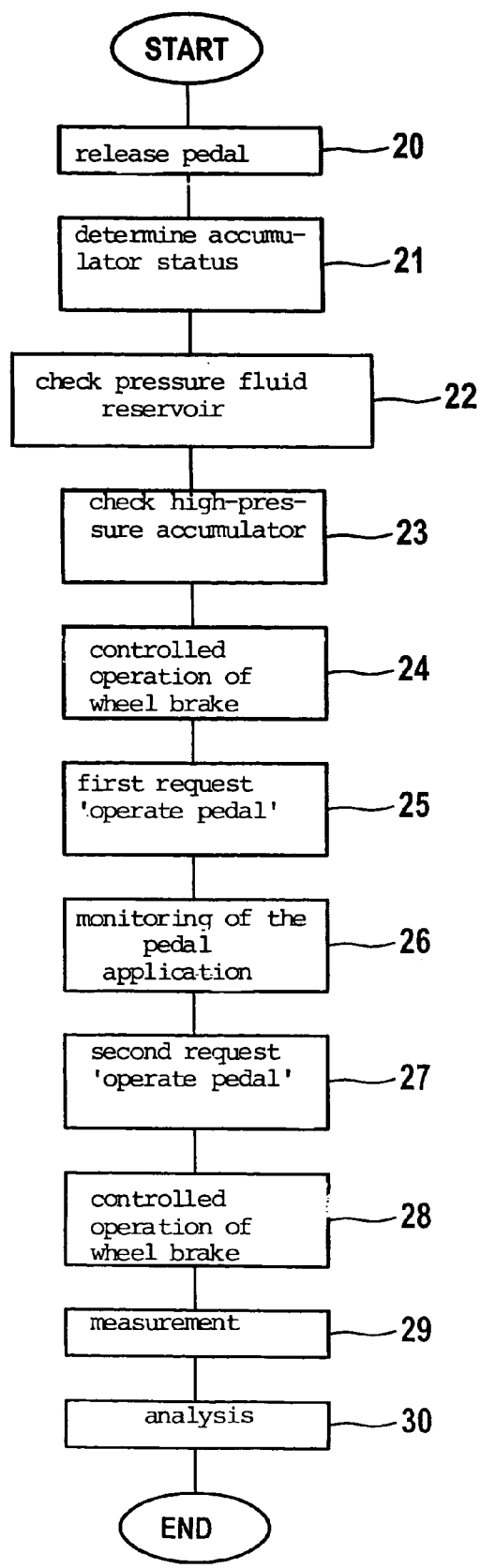
FIG. 2 is a flow chart showing the method of the invention.

Maintenance of the brake system is necessary in regular intervals, especially exchange of the brake fluid is needed. Errors may occur in this respect. For example, it is likely that connections are interchanged or that the brake system is not bled properly, what causes air inclusions. Therefore, the following process is suggested for checking the braking system:

The process is menu-driven, its run being represented in FIG. 2. This means an onboard computer with a display guides the driver or the fitter in executing the individual steps. The process can be carried out 'voluntarily', e.g. upon the driver's request, by invoking a corresponding menu. The process can, however, also be carried out forcibly in that corresponding instructions are given to the driver (fitter) in a menu-controlled manner, and said instructions have to be processed before the vehicle can be set working. In both cases the process starts with the request (step 20) sent to the driver to fully release the brake pedal of the master brake cylinder 1, what can be detected by means of the sensor equipment. Another precondition for triggering the process is that the vehicle is at standstill.

Subsequently, the memory condition is found out by means of a travel sensor 15 at the metal pleated-bellows accumulator 6 (step 21). Unless the accumulator is completely bled except for a defined residual quantity so that a bottom valve 16 actuated by the pleated bellows is closed, the inlet and outlet valves 8, 9 are opened so that the pressure fluid flows out of the metal pleated-bellows accumulator 6 into the pressure fluid reservoir 4. Also, the fluid level in the pressure fluid reservoir 4 (step 22) is checked.

Because the brake system is completely unpressurized in this condition, it is also necessary that all pressure sensors 11, 12, 13 in the system register this condition. This fact can be used to adjust these pressure sensors, with at least the inlet valves 8 being opened, so that the points monitored by the pressure sensors are hydraulically connected and, thus, assume an equal pressure level. Thereafter the metal pleated-bellows accumulator 6 is charged (step 23), and then pressure of at least 30 bar is built up in the wheel brakes 7 (step 24) with the separating valve 10 closed, the inlet valves 8 opened, and the outlet valves 11 closed. In case pressure buildup in the wheel brakes 7 does not occur in spite of open inlet valves 8, this is an indication that the connections of conduits at a valve block accommodating the valves 8, 9, 10, 14 have been interchanged. Subsequently, the pressure in the wheel brakes 7 is decreased again by opening the outlet valves 9. The clearance of the wheel brakes 7 is thereby given a defined quantity.

Thereafter the driver receives the request to apply the pedal slowly, evenly and powerfully (step 25). Separating valve 10 is closed during the actuation. Pressure increase is monitored (step 26), that means a master brake cylinder pressure of at least 15 bar approximately should be reached, and the speed of the pedal depressions should not exceed 10 mm/s. In particular the master brake cylinder 1 and, thus, the position of its sleeves is set into a normal condition with this initial braking operation. The pedal is then released again. The brake system now adopts a basic condition with known parameters. If the mentioned values are not maintained or reached, a new request will be issued.

Thereafter follows a second request to apply the pedal (step 27). Likewise this application is monitored in terms of the actuating speed and the pressure build-up achieved. As this occurs, the separating valve 10 is also closed. A controlled pressure build-up takes place simultaneously in the wheel brakes (step 28), and pressure of at least 30 bar is reached. During this actuation of the master cylinder 1 and the controlled pressure build-up, the pedal travel is measured (step 29) by means of a corresponding pedal travel sensor, the master brake cylinder pressure is measured by the simulator pressure sensor 13, the wheel brake cylinder pressures are measured by the wheel pressure sensors 11, and the volume intake is measured as well. The volume intake is determined by the change of the degree of filling of the metal pleated-bellows accumulator 6 and the rate of delivery of the pumps 5. The data obtained is combined with each other and compared with nominal values (step 30). This comparison allows reliably detecting whether the brake fluid is loaded with air, or whether air inclusions prevail.

With each of the above-mentioned steps all relevant measured quantities are monitored and compared with nominal values. If discrepancies are detected, either the steps are repeated or warnings generated, and initiation of the vehicle is prevented when very grave errors prevail.

Error messages can be, for example: 'unit is defective', 'conduits are interchanged', 'unit is poorly bled', or 'pumping capacity is insufficient'.

The invention claimed is:

1. Method for testing a bleeding quality of an electrohydraulic braking system, comprising a pedal-operated master brake cylinder and a brake circuit controlled by the master brake cylinder pressure and including a pump whose suction side is connected to a pressure fluid reservoir and a high-pressure accumulator, as well as inlet and outlet valves for the wheel brakes connected to the brake circuit, with the master brake cylinder being connected to the brake circuit downstream of the inlet valves by way of a separating valve, comprising the following steps:

a) Bleeding the high-pressure accumulator;
b) Re-filling the high-pressure accumulator, wherein during re-filling of the high-pressure accumulator the filling degree of the high-pressure accumulator and the volume flow through the pump is determined;
c) Comparing the actual values determined with preset specifications;
d) Applying the brake pedal when the separating valve is closed, so that a defined amount of pressure is applied to the wheel brakes connected to the brake circuit;
e) Releasing the brake pedal;
f) Re-applying the brake pedal, with at least the following data being detected:
pedal travel,
master brake cylinder pressure,
wheel brake cylinder pressure,
pressure fluid removal from the high-pressure accumulator;
g) Determining the volume intake of the master brake cylinder and a conduit reaching up to the separating valve by way of the determined pedal travel and the master brake cylinder pressure and comparison with the preset specifications;
h) Determining the volume intake of the pressurized brake circuit by way of the pressure fluid removal from the high-pressure accumulator and the wheel brake cylinder pressures and comparison with the preset specifications; and
i) Delivering an appropriate warning when predetermined criteria are not satisfied.

2. Method as claimed in claim 1, wherein the pedal application is monitored in terms of the actuating speed and the master brake cylinder pressure achieved, and the method is only continued when defined limit values are maintained.

3. Method as claimed in claim 1, wherein a temperature of the brake system is determined and the method is performed only when said temperature is in a predetermined normal range.

4. Method as claimed in claim 1, wherein a result of the comparison between the actual values determined with preset specifications is stored in a readable electronic memory.

* * * * *